C. W. STEELE.
BUFFING AND CEMENTING MACHINE.
APPLICATION FILED JULY 16, 1918.
1,332,929.
Patented Mar. 9, 1920.
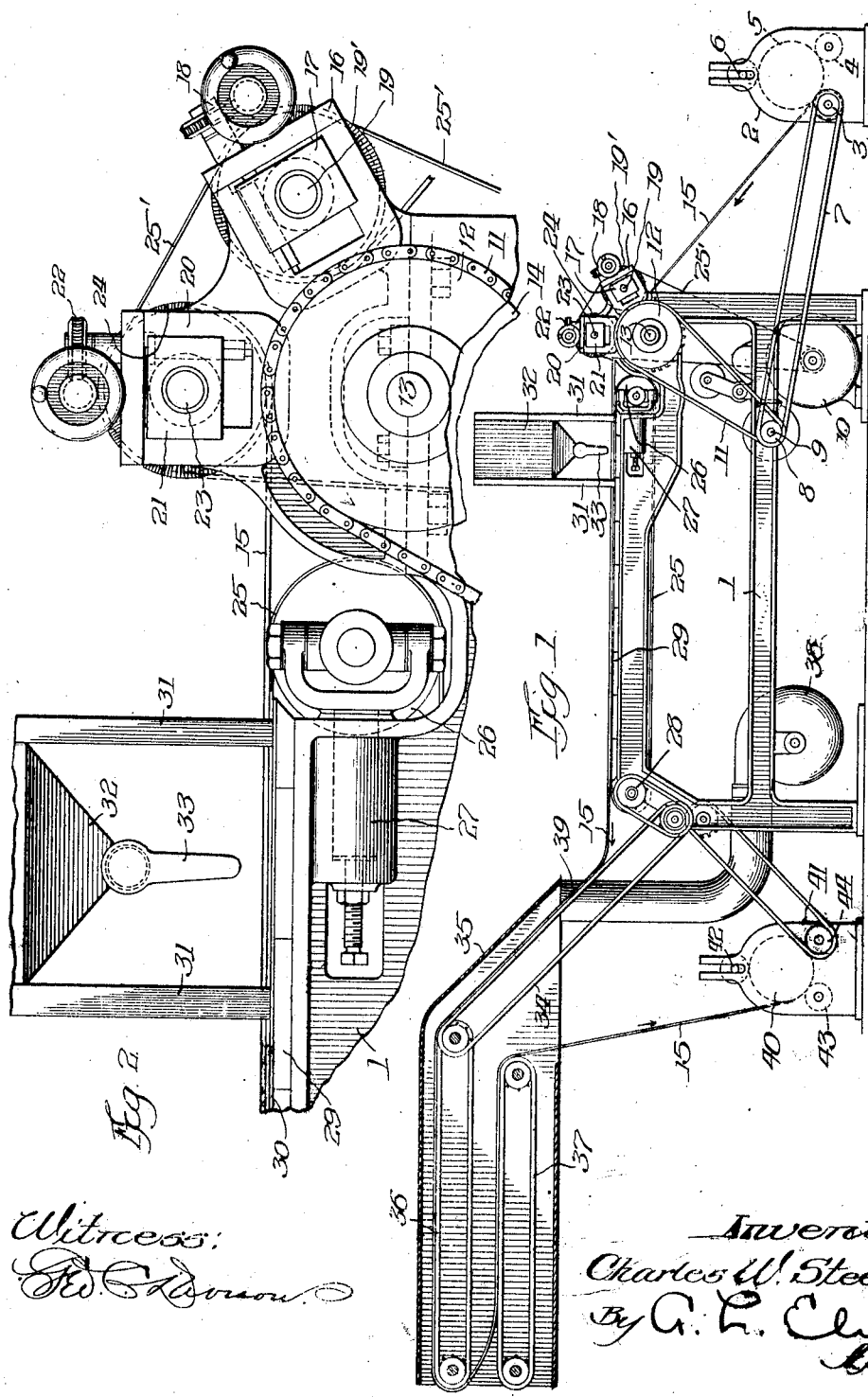
Witness:
Geo. E. Harrison
Inventor
Charles W. Steele
By G. L. Ely
Atty

UNITED STATES PATENT OFFICE.

CHARLES W. STEELE, OF AKRON, OHIO, ASSIGNOR TO THE FIRESTONE TIRE AND RUBBER COMPANY, OF AKRON, OHIO, A CORPORATION OF OHIO.

BUFFING AND CEMENTING MACHINE.

1,332,929.  Specification of Letters Patent.  Patented Mar. 9, 1920.

Application filed July 16, 1918. Serial No. 245,220.

*To all whom it may concern:*

Be it known that I, CHARLES W. STEELE, a citizen of the United States, residing at Akron, in the county of Summit, State of Ohio, have invented certain new and useful Improvements in Buffing and Cementing Machines, of which the following is a specification.

In the manufacture of rubber gum sheets such as used for repair stocks or analogous purposes it is customary to cure the rubber between mica sheets, and in preparing the stock for use or shipment it is necessary to remove the flakes of mica which adhere to the surface of the gum and then coat the gum with rubber cement which is distributed over its surface. The flakes of mica are removed by buffing the surface of the gum and the cement is poured over the buffed surface and evenly distributed by the operator. The buffed and cemented gum is now led into a chamber in which air is strongly circulated to evaporate the solvent in the cement and bring the gum to the proper tacky condition in which it is rolled between a liner.

The operation of cementing the gum was formerly done by hand and no effort was made to remove the adherent mica flakes. The operation was necessarily more or less unsatisfactory and it is the purpose of this invention to construct a machine which will do the buffing and cementing better and more rapidly than was done by hand.

In the drawings accompanying this application, I have shown one form of the device, but it is understood that the invention is not limited to the details but may be varied within the scope of the claims appended hereto.

Figure 1 is a side elevation of the entire machine.

Fig. 2 is an enlarged detail of the buffing and cementing instrumentalities.

In the drawings 1 represents the framework which supports the brushes, table, and other parts of the machine. At one side of the machine is arranged a standard 2 carrying two rolls 3 and 4 which support the roll of gum and liner 5. On the top of the roll is a take up roller 6 for the liner. The roller 3 is driven by a belt 7 which is carried over a pulley mounted on a shaft 9 carried on the frame. A motor 10 drives the machine, the shaft 9 deriving its rotation in any preferred manner from the motor. The shaft 9 also drives a chain 11 which passes over a sprocket 12 which is carried on a shaft 13 in the upper right hand corner of the framework. The shaft carries a platen roll indicated by the numeral 14 which receives the gum 15 as it leaves the roll 5.

Mounted on the frame in the upper right corner are housings 16 in which are mounted bearings 17 which are adjustable toward and away from the platen roll by any suitable means, a common device being indicated generally by the numeral 18. The bearings 17 carry the shaft 19 of a stout brush 19' which is preferably made of steel wire and serves to remove the dust from the surface of the gum and roughens it to receive the cement, the gum passing between the platen roll and the wire brush. Directly above the platen is arranged a similar pair of housings 20 carrying slidable bearings 21 adjustably mounted by similar means 22, the shaft 23 carrying a second brush 24, preferably of bristles which gives a final cleaning and buffing action on the surface of the gum carried on the platen roll. The brushes 19' and 24 are rapidly rotated by a belt 25' which passes over pulleys on their respective shafts and over a small pulley on the shaft of the motor.

From the platen roll the gum passes onto a belt 25 arranged over one pulley 26 which is adjustably mounted at 27 in the framework near the platen roll, and over a second pulley 28 in the upper left hand corner of the frame. The upper run of the belt passes over a long table 29 on top of the frame which is covered by a sheet of zinc 30 or other suitable covering.

On the front end of the table are mounted uprights 31 which support a tank 32 containing the rubber cement which is allowed to flow on to the surface of the gum through a spout 33. As the sheet of gum passes from under the spout onto the table, the cement is distributed over the surface by any suitable means. The pulley 28 is rotated by any suitable means.

Driven in any suitable manner from the belt 25 is an inclined belt 34 which carries the gum up into a hood or drying chamber, and on to a third horizontal belt 36 also located in the hood, from which it passes onto a fourth horizontal belt 37 directly below the belt 36. A strong blast of air is circulated in the hood from a fan 38 which delivers through a pipe 39 into the hood. From the belt 37 the gum, which has been thoroughly buffed and cemented and dried by the air blast, is wound up in a roll 40 in a standard 41 between the turns of a sheet of liner fabric furnished from a roll 42. The roll is supported by two rollers 43 and 44, one of which is rotated to wind up the gum and liner.

The machine shown herein will rapidly and efficiently buff and cement rubber gum in a manner superior to that which can be effected in the hand operation.

It is obvious that changes and modifications may be made in the machine as shown without departing from the spirit of the invention or sacrificing any its benefits.

I claim:

1. In a machine for the purposes set forth, a supply roll for the gum, a platen roll, a steel brush located over the platen roll, a second brush, means for applying cement to the surface of the gum, a table over which the gum is carried, a chamber, means for conveying the gum through the chamber, and means for circulating air through the chamber.

2. In a machine for the purposes set forth the combination of supply and wind up rolls for the gum of a platen, a wire and a bristle brush above the platen, means for applying cement to the surface of the gum, a table over which the gum passes, a drying chamber, and means for conveying the gum through the chamber, the said instrumentalities being located in the order named.

3. In a machine for the purposes set forth, the combination of supply and wind up rolls for the gum of a rotary platen, a wire brush above the platen, a bristle brush also above the platen and beyond the wire brush, a tank above the surface of the gum and delivering to the surface thereof, a table for supporting the gum, a drying chamber, and means for conveying the gum over the table and into and through the chamber.

CHARLES W. STEELE.